(12) United States Patent
Bouz et al.

(10) Patent No.: US 10,999,140 B2
(45) Date of Patent: May 4, 2021

(54) MITIGATION OF LIKELIHOOD AND IMPACT OF A SERVER-RECONFIGURATION FAILURE

(71) Applicant: International Business Machines Corporation, Armonk, NY (US)

(72) Inventors: Firas Bouz, Lexington, KY (US); Pawel Jasionowski, Wroclaw (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/739,305

(22) Filed: Jan. 10, 2020

(65) Prior Publication Data

US 2020/0153683 A1 May 14, 2020

Related U.S. Application Data

(63) Continuation of application No. 16/026,831, filed on Jul. 3, 2018, now Pat. No. 10,567,226, which is a
(Continued)

(51) Int. Cl.
*H04L 12/24* (2006.01)

(52) U.S. Cl.
CPC .......... *H04L 41/082* (2013.01); *H04L 41/069* (2013.01); *H04L 41/142* (2013.01); *H04L 41/147* (2013.01)

(58) Field of Classification Search
CPC ... H04L 41/082; H04L 41/069; H04L 41/142; H04L 41/147; G06Q 10/0635
See application file for complete search history.

(56) References Cited

U.S. PATENT DOCUMENTS

| 7,386,845 B1 | 6/2008 | Fox |
| 8,732,534 B2 | 5/2014 | Kini |
| (Continued) | | |

FOREIGN PATENT DOCUMENTS

| CN | 103514504 A | 1/2014 |
| WO | 2015016869 A1 | 2/2015 |

OTHER PUBLICATIONS

Bogojeska, J. et al.; Classifying server behavior and predicting impact of modernization actions; Proceedings of the 9th International Conference on Network and Service Management; Oct. 14-18, 2013, 3 pages.
(Continued)

*Primary Examiner* — Benjamin M Thieu
(74) *Attorney, Agent, or Firm* — Schmeiser, Olsen & Watts; Nicholas L. Cadmu

(57) ABSTRACT

A method and associated systems for predicting a degree of risk associated with a planned change to a computer server or other electronic component. A computerized change-management system receives Probability and Impact inputs derived from user-derived input, from which it determines a Baseline risk of change failure. The system processes mined data to determine an historic change-failure rate as a function of a type of change, and computes a predictive incident probability based on a predictive analytics engine's forecast of whether a particular type of server will be problematic. The system then computes a final Change Risk by adjusting the Baseline risk as a function of the historic change-failure rate, the predictive incident-probability, and a Baseline-specific weighting factor. If the resulting Change Risk is judged to be elevated, the system initiates collateral actions and notifications intended to reduce the probability and impact of a change failure.

20 Claims, 6 Drawing Sheets

Related U.S. Application Data continuation of application No. 14/954,134, filed on Nov. 30, 2015, now Pat. No. 10,084,645.

(56) References Cited

U.S. PATENT DOCUMENTS

| | | | |
|---|---|---|---|
| 10,084,645 B2 | 9/2018 | Bouz | |
| 2004/0059589 A1* | 3/2004 | Moore | G06Q 40/08 705/7.28 |
| 2008/0033775 A1 | 2/2008 | Dawson | |
| 2009/0070188 A1 | 3/2009 | Scott | |
| 2010/0138253 A1 | 6/2010 | Chao | |
| 2010/0153156 A1 | 6/2010 | Guinta | |
| 2010/0241891 A1* | 9/2010 | Beasley | G06F 11/079 714/1 |
| 2012/0232948 A1* | 9/2012 | Wolf | G06Q 10/067 705/7.28 |
| 2013/0006701 A1* | 1/2013 | Guven | G06Q 10/0635 705/7.28 |
| 2015/0088783 A1 | 3/2015 | Mun | |
| 2015/0100579 A1 | 4/2015 | Oba | |
| 2015/0178637 A1 | 6/2015 | Bogojeska | |
| 2016/0119195 A1 | 4/2016 | Blondeau | |
| 2017/0155549 A1 | 6/2017 | Bouz | |
| 2018/0375719 A1 | 12/2018 | Bouz | |

OTHER PUBLICATIONS

Bogojeska, J. et al.; Predictive Analytics for Server Incident Reduction; ERCIM NEWS online edition; https://ercim-news.ercim.eu/en102/r-i/predictive-analytics-for-server-incident-reduction; Jun. 30, 2015; 8 pages.

Guven et al., Change Risk Expert: Leveraging advanced classification and risk management techniques for systematic change failure reduction, IEEE Xplore, Date of Conference Apr. 16-20, 2012, 3 pages.

Labriola, Donald J.; List of IBM Patents or Patent Applications Treated as Related; Jan. 10, 2020; 1 page.

* cited by examiner

MITIGATION OF LIKELIHOOD AND IMPACT OF A SERVER-RECONFIGURATION FAILURE

CROSS REFERENCE TO RELATED APPLICATIONS

This application is a continuation application claiming priority to Ser. No. 16/026,831 filed Jul. 3, 2018, now U.S. Pat. No. 10,567,226 issued Feb. 18, 2020, which is a continuation application claiming priority to Ser. No. 14/954,134, filed Nov. 30, 2015 now U.S. Pat. No. 10,084,645 issued Sep. 25, 2018, the contents of which are hereby incorporated by reference.

TECHNICAL FIELD

The present invention relates to predicting a risk associated with updating a computer server in order to mitigate that risk before the update takes place.

BACKGROUND

Moving, updating, configuring, adding, removing, and other types of changes that may be performed on a server or other computerized device involves a degree of risk. This risk may be a function of a likelihood that the change will be successful, of the potential for unexpected consequences or undesirable side effects triggered by the change, or of an impact on a business or user should the change not be completed as intended.

BRIEF SUMMARY

A first embodiment of the present invention provides a computerized change-management system comprising a processor, a memory coupled to the processor, and a computer-readable hardware storage device coupled to the processor, the storage device containing program code configured to be run by the processor via the memory to implement a method for estimating server-change risk by corroborating historic failure rates, predictive analytics, and user projections, the method comprising:

the system receiving a set of probability inputs that describe a probability that a planned server change will fail;

the system further receiving a set of impact inputs that describe an impact of a failure of the planned server change;

the system computing a baseline risk of change failure as functions of the set of probability inputs and of the set of impact inputs;

the system identifying a historic change-failure rate as a function of mined data that characterizes past attempted server changes;

the system calculating a predictive incident probability as a function of a predictive analytics engine's prediction of a likelihood that the planned server change will be problematic; and the system deriving a change-risk value by adjusting the baseline risk as a function of the historic change-failure rate and of the predictive incident probability.

A second embodiment of the present invention provides a method for estimating server-change risk by corroborating historic failure rates, predictive analytics, and user projections, the method comprising:

the system receiving a set of probability inputs that describe a probability that a planned server change will fail;

the system further receiving a set of impact inputs that describe an impact of a failure of the planned server change;

the system computing a baseline risk of change failure as functions of the set of probability inputs and of the set of impact inputs;

the system identifying a historic change-failure rate as a function of mined data that characterizes past attempted server changes;

the system calculating a predictive incident probability as a function of a predictive analytics engine's prediction of a likelihood that the planned server change will be problematic; and the system deriving a change-risk value by adjusting the baseline risk as a function of the historic change-failure rate and of the predictive incident probability.

A third embodiment of the present invention provides a computer program product, comprising a computer-readable hardware storage device having a computer-readable program code stored therein, the program code configured to be executed by computerized change-management system comprising a processor, a memory coupled to the processor, and a computer-readable hardware storage device coupled to the processor, the storage device containing program code configured to be run by the processor via the memory to implement a method for estimating server-change risk by corroborating historic failure rates, predictive analytics, and user projections, the method comprising:

the system receiving a set of probability inputs that describe a probability that a planned server change will fail;

the system further receiving a set of impact inputs that describe an impact of a failure of the planned server change;

the system computing a baseline risk of change failure as functions of the set of probability inputs and of the set of impact inputs;

the system identifying a historic change-failure rate as a function of mined data that characterizes past attempted server changes;

the system calculating a predictive incident probability as a function of a predictive analytics engine's prediction of a likelihood that the planned server change will be problematic; and the system deriving a change-risk value by adjusting the baseline risk as a function of the historic change-failure rate and of the predictive incident probability.

DETAILED DESCRIPTION

Figure 1:
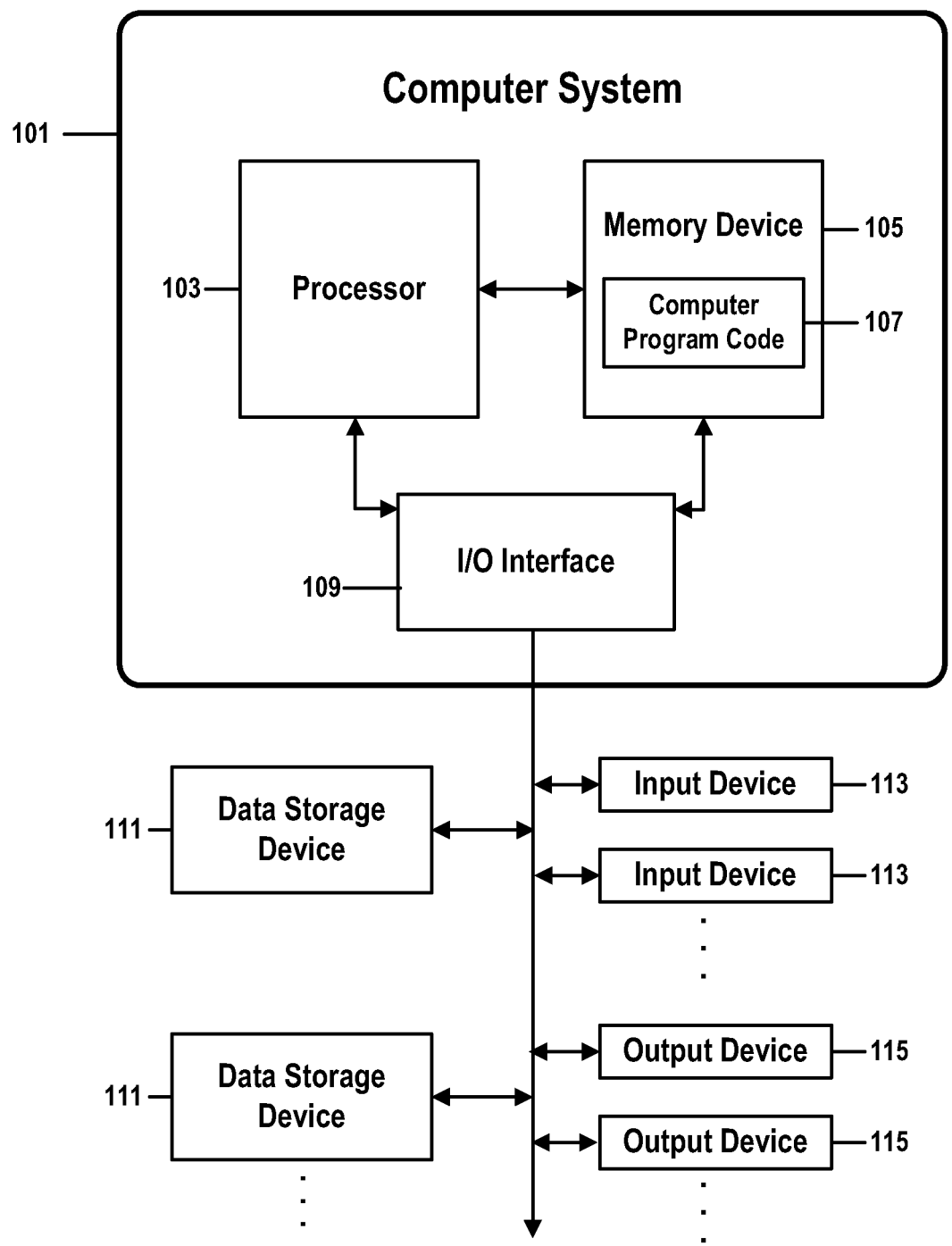
FIG. 1 shows a structure of a computer system and computer program code that may be used to implement a method for estimating server-change risk by corroborating historic failure rates, predictive analytics, and user projections in accordance with embodiments of the present invention.

In an information technology or other type of computing or networked environment, performing almost any change to a system, infrastructure, or virtual hardware or software component entails some degree of risk. Even a regular update to a desktop operating system, for example, if not properly assessed and coordinated, can impact a business by preventing a use from being able to use previously operational mission-critical desktop applications.

Many types of risk may be associated with such changes, such as a risk that a change is not properly authorized or assed; a risk that the change will produce an unexpected effect, such as a service outage; a risk of a low success rate; or a risk that a high number of changes will be implemented as emergency changes.

This document will describe methods and systems for identifying and managing a general concept of risk, and will provide examples that address risk associated with implementing a change to a computerized server. In more general embodiments, however, underlying concepts and principles may be applied to any type of risk associated with a planned activity.

Although risk itself is a general concept that may be interpreted in many ways, embodiments and examples of the present invention presented here address risk that comprises at least a first measure of a probability that a proposed activity (such as a server upgrade) may fail and a second measure of a severity of impact that would result should such a failure occur.

The present invention comprises methods and systems for a change-risk calculator for reducing failure rates based on a current baseline risk assessment, historic statistical failure rates, and projected failures forecast by a method of predictive analytics. It uses a succession of refining techniques to more accurately predict a risk associated with a planned server change, such as a software or hardware upgrade, a physical or virtual move to a different platform or network, or a reconfiguration of a system or infrastructure component. This risk may be a function of both a probability that the proposed change will not be successful and a measure of an impact of such a failure on a business or user.

Unlike existing methods, the present invention estimates change risk by means of a multi-phased analysis that combines information culled from current conditions, historic records, and predictive analytics. The present invention also considers both statistical analyses of risk factors relevant to general classes of servers and changes, as well as targeted characteristics specific to the server and the change currently being analyzed.

Finally, the present invention performs this analysis on-demand, prior to a commitment to perform the change or to perform the change in a particular manner, by using real-time computer-based computations to analyze enormous amounts of dynamic data that represent an instantaneous snapshot of current factors upon which a nuanced risk analysis may be based.

The real-time nature of the change-risk calculator also facilitates the present invention's automated risk-mitigation features. Embodiments may, as a function of the real-time change-risk analysis, characterize a proposed change based on the degree of risk with which it is associated and, if that risk exceeds a threshold or satisfies another predetermined condition, launch remedial or mitigating measures. These measures may comprise automatically applying hardware or software server updates; changing a configuration of the server or of an infrastructure or other component associated with the server; notifying interested parties of the proposed change and the elevated level of risk that the change may present; automatically authorizing or deploying backout plans that may allow the change, or adverse effects of the change, to be reversed; or other steps that might reduce an elevated risk associated with the planned change.

Although not essential to every embodiment of the present invention, it may be essential to certain embodiments that steps identified by FIGS. 2-6 are performed in real-time or, at worst, are performed quickly enough that the Probability inputs, the Impact inputs, the historic data from which an historic change-failure rate is computed, and the predictive output of a predictive analytics engine (or similar module) from which the predictive incident probability is derived do not change in a statistically meaningful way. This requirement is generally possible to satisfy if a method of the present invention is implemented electronically, by means of one or more computerized or networked systems. But it would be impossible if attempted by means of purely human activities. Because embodiments of the present invention can produce statistically meaningful results only when analyzing an enormous body of frequently updated data, from which must be identified or inferred large numbers of complex, nuanced relationships, it is not possible to implement this invention without automated access to computerized, networked tools like data warehouses, data-mining applications, predictive analytic engines, and higher-powered computer systems that have access to very large data-storage resources.

Embodiments of the present invention thus provide an automated end-to-end method of identifying, refining, and addressing change risk. They: i) automatically determine a current risk associated with a proposed change, based on historical evidence, predictive analytics, and a real-time current snapshot of systems and other entities that might affect a level of change risk; and ii) identify and implement corrective procedures that may reduce the elevated risk of a failure or mitigate adverse effects that might result if such a failure does occur.

FIG. 1 shows a structure of a computer system and computer program code that may be used to implement a method for estimating server-change risk by corroborating historic failure rates, predictive analytics, and user projections in accordance with embodiments of the present invention. FIG. 1 refers to objects 101-115.

Aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In FIG. 1, computer system 101 comprises a processor 103 coupled through one or more I/O Interfaces 109 to one or more hardware data storage devices 111 and one or more I/O devices 113 and 115.

Hardware data storage devices 111 may include, but are not limited to, magnetic tape drives, fixed or removable hard disks, optical discs, storage-equipped mobile devices, and solid-state random-access or read-only storage devices. I/O devices may comprise, but are not limited to: input devices 113, such as keyboards, scanners, handheld telecommunications devices, touch-sensitive displays, tablets, biometric readers, joysticks, trackballs, or computer mice; and output devices 115, which may comprise, but are not limited to printers, plotters, tablets, mobile telephones, displays, or sound-producing devices. Data storage devices 111, input devices 113, and output devices 115 may be located either locally or at remote sites from which they are connected to I/O Interface 109 through a network interface.

Processor 103 may also be connected to one or more memory devices 105, which may include, but are not limited to, Dynamic RAM (DRAM), Static RAM (SRAM), Programmable Read-Only Memory (PROM), Field-Programmable Gate Arrays (FPGA), Secure Digital memory cards, SIM cards, or other types of memory devices.

At least one memory device 105 contains stored computer program code 107, which is a computer program that comprises computer-executable instructions. The stored computer program code includes a program that implements a method for estimating server-change risk by corroborating historic failure rates, predictive analytics, and user projections in accordance with embodiments of the present invention, and may implement other embodiments described in this specification, including the methods illustrated in FIGS. 1-6. The data storage devices 111 may store the computer program code 107. Computer program code 107 stored in the storage devices 111 is configured to be executed by processor 103 via the memory devices 105. Processor 103 executes the stored computer program code 107.

In some embodiments, rather than being stored and accessed from a hard drive, optical disc or other writeable, rewriteable, or removable hardware data-storage device 111, stored computer program code 107 may be stored on a static, nonremovable, read-only storage medium such as a Read-Only Memory (ROM) device 105, or may be accessed by processor 103 directly from such a static, nonremovable, read-only medium 105. Similarly, in some embodiments, stored computer program code 107 may be stored as computer-readable firmware 105, or may be accessed by processor 103 directly from such firmware 105, rather than from a more dynamic or removable hardware data-storage device 111, such as a hard drive or optical disc.

Thus the present invention discloses a process for supporting computer infrastructure, integrating, hosting, maintaining, and deploying computer-readable code into the computer system 101, wherein the code in combination with the computer system 101 is capable of performing a method for estimating server-change risk by corroborating historic failure rates, predictive analytics, and user projections.

Any of the components of the present invention could be created, integrated, hosted, maintained, deployed, managed, serviced, supported, etc. by a service provider who offers to facilitate a method for estimating server-change risk by corroborating historic failure rates, predictive analytics, and user projections. Thus the present invention discloses a process for deploying or integrating computing infrastructure, comprising integrating computer-readable code into the computer system 101, wherein the code in combination with the computer system 101 is capable of performing a method for estimating server-change risk by corroborating historic failure rates, predictive analytics, and user projections.

One or more data storage units 111 (or one or more additional memory devices not shown in FIG. 1) may be used as a computer-readable hardware storage device having a computer-readable program embodied therein and/or having other data stored therein, wherein the computer-readable program comprises stored computer program code 107. Generally, a computer program product (or, alternatively, an article of manufacture) of computer system 101 may comprise the computer-readable hardware storage device.

While it is understood that program code 107 for estimating server-change risk by corroborating historic failure rates, predictive analytics, and user projections may be deployed by manually loading the program code 107 directly into client, server, and proxy computers (not shown) by loading the program code 107 into a computer-readable storage medium (e.g., computer data storage device 111), program code 107 may also be automatically or semi-automatically deployed into computer system 101 by sending program code 107 to a central server (e.g., computer system 101) or to a group of central servers. Program code 107 may then be downloaded into client computers (not shown) that will execute program code 107.

Alternatively, program code 107 may be sent directly to the client computer via e-mail. Program code 107 may then either be detached to a directory on the client computer or loaded into a directory on the client computer by an e-mail option that selects a program that detaches program code 107 into the directory.

Another alternative is to send program code 107 directly to a directory on the client computer hard drive. If proxy servers are configured, the process selects the proxy server code, determines on which computers to place the proxy servers' code, transmits the proxy server code, and then installs the proxy server code on the proxy computer. Program code 107 is then transmitted to the proxy server and stored on the proxy server.

In one embodiment, program code 107 for estimating server-change risk by corroborating historic failure rates, predictive analytics, and user projections is integrated into a client, server and network environment by providing for program code 107 to coexist with software applications (not shown), operating systems (not shown) and network operating systems software (not shown) and then installing program code 107 on the clients and servers in the environment where program code 107 will function.

The first step of the aforementioned integration of code included in program code 107 is to identify any software on the clients and servers, including the network operating system (not shown), where program code 107 will be deployed that are required by program code 107 or that work in conjunction with program code 107. This identified software includes the network operating system, where the network operating system comprises software that enhances a basic operating system by adding networking features. Next, the software applications and version numbers are identified and compared to a list of software applications and correct version numbers that have been tested to work with program code 107. A software application that is missing or that does not match a correct version number is upgraded to the correct version.

A program instruction that passes parameters from program code 107 to a software application is checked to ensure that the instruction's parameter list matches a parameter list required by the program code 107. Conversely, a parameter passed by the software application to program code 107 is checked to ensure that the parameter matches a parameter required by program code 107. The client and server operating systems, including the network operating systems, are identified and compared to a list of operating systems, version numbers, and network software programs that have been tested to work with program code 107. An operating system, version number, or network software program that does not match an entry of the list of tested operating systems and version numbers is upgraded to the listed level on the client computers and upgraded to the listed level on the server computers.

After ensuring that the software, where program code 107 is to be deployed, is at a correct version level that has been tested to work with program code 107, the integration is completed by installing program code 107 on the clients and servers.

Embodiments of the present invention may be implemented as a method performed by a processor of a computer system, as a computer program product, as a computer system, or as a processor-performed process or service for supporting computer infrastructure.

Figure 2:
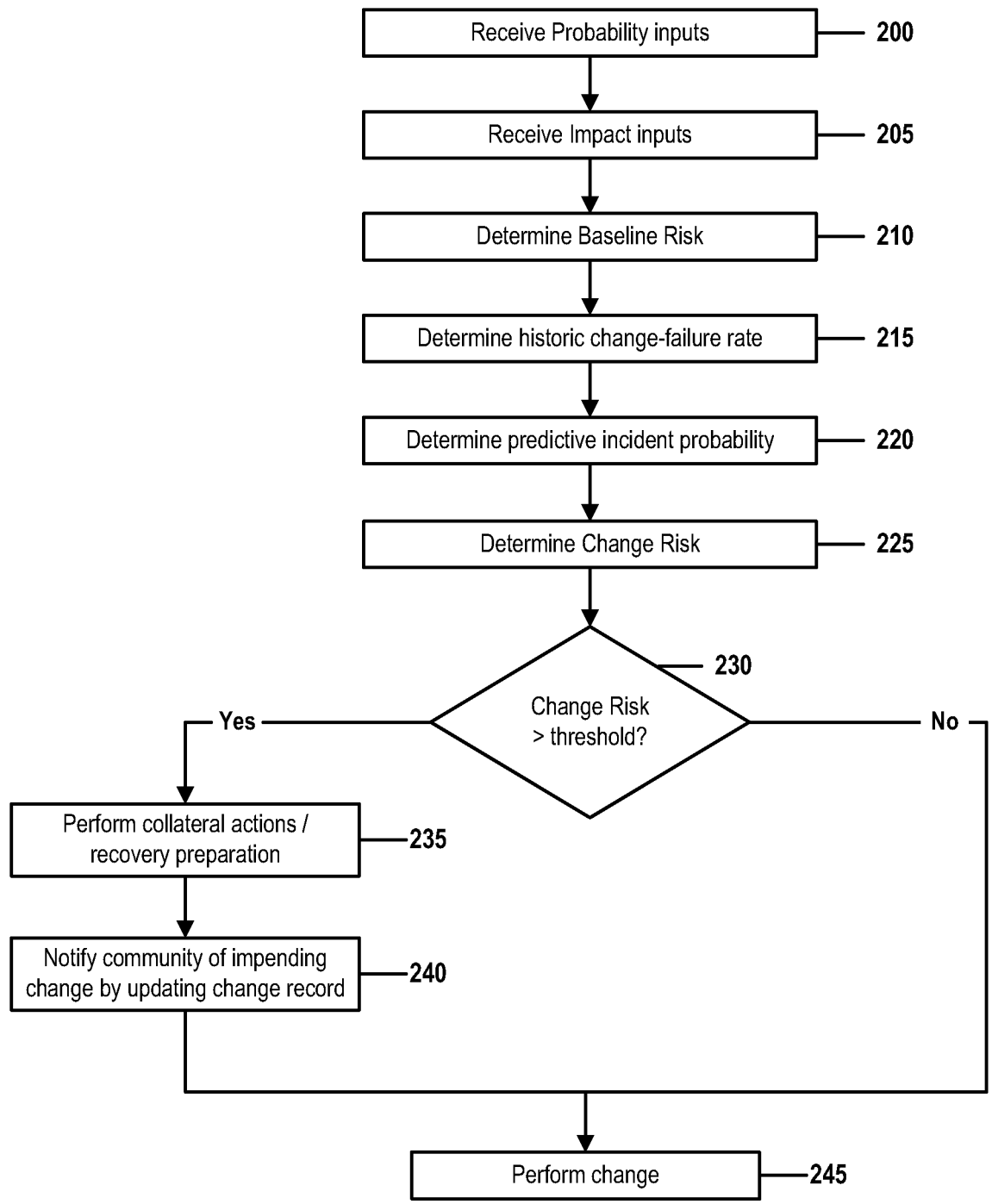
FIG. 2 is a flow chart that illustrates a method for estimating server-change risk by corroborating historic failure rates, predictive analytics, and user projections in accordance with embodiments of the present invention.

FIG. 2 is a flow chart that illustrates a method for estimating server-change risk by corroborating historic failure rates, predictive analytics, and user projections in accordance with embodiments of the present invention. FIG. 2 shows steps 200-245.

In step 200, one or more processors receive a set of risk-probability input values. These inputs may be represented as any type of meaningful codes, numeric values, scaled or weighted numbers, tier identifications, or other type of representation known in the art. In examples described in this document, these Probability values may be arbitrarily represented as integer numbers in the inclusive range of 1 to 4.

Risk-probability values may be collected or inferred by any means known in the art capable of identifying relative probabilities that the proposed server change may fail, where those relative probabilities may be based on estimates or evaluations of end-users, technical experts, manufacturers, expert systems, or other current, updated expert information sources.

These risk-probability values may, for example, have been entered by users in response to survey questions that each ask a user to estimate a probability of a failure of a distinct type of server change. In such an example, a user may answer each question by selecting a value in an inclusive range of 1 to 4, where each of those values is interpreted as a relative degree of a probability that the proposed server change will fail.

In some embodiments, the survey questions may have been submitted to large numbers of users who may have different characteristics, experiences, or areas of expertise. In some embodiments, multiple surveys may have been used, each of which may comprise a distinct subset or a variant order of a master set of questions. In some cases, a survey may choose questions or an order of questions conditionally, wherein a question is selected as a function of a user's answer to a previous question.

In some embodiments, answers to survey questions may further comprise answers read from an archived body of answers that were submitted in response to previous surveys.

Similarly, in step 205, the one or more processors receive a set of risk-impact input values. These inputs may be represented as any type of meaningful codes, numeric values, scaled or weighted numbers, tier identifications, or other type of representation known in the art. In examples described in this document, these Impact values may be arbitrarily represented as integer numbers in the inclusive range of 1 to 3.

Risk-impact values may be collected or inferred by any means known in the art capable of identifying relative impacts of a failure of the proposed server change, where values of those relative impacts may be based on estimates or evaluations of end-users, technical experts, manufacturers, expert systems, or other current, updated expert information sources.

These Impact values may, for example, have been entered by users in response to survey questions that each ask a user to estimate an aspect of an impact of a failure of a server change. In such an example, a user may answer each question by selecting a value in an inclusive range of 1 to 3, where each of those values is interpreted as a relative degree of impact that would result should the proposed server change fail.

In step 210, the one or more processors manipulate the Probability and Impact values received in steps 200 and 205 to determine a "Baseline risk" associated with the proposed server change. This procedure is described in greater detail in FIG. 3.

In embodiments of the present invention, a value of a Baseline risk represents a human evaluation of change risk based on first-hand experience and a current perspective of a human expert. Such a Baseline risk may take into account factors discernible only to a human observer and may comprise opinions or points of view that may not be immediately apparent through a straightforward mathematical or computational analysis of historical data.

A Baseline risk, however, may depend upon factors limited to those apparent to human observers. More nuanced relationships among events or statistics that are separated in time or that occur in different physical locations may not be visible to a human expert evaluator, or to an expert-system computerized evaluator that emulates a thought process of a human being.

The Baseline risk calculated in this step is thus only a baseline starting point of a multi-phase procedure that further refines this initial risk estimate in novel ways.

A value of a Baseline risk may be represented as any type of meaningful alphanumeric code, integer or decimal numeric value, scaled or weighted number, tier level or priority level, or other type of representation known in the art. In examples described in this document, a Baseline risk number is arbitrarily chosen to be an integer value falling within an inclusive range of 1 through 4.

In step 215, the one or more processors identify a historic change-failure rate based on archived data that characterizes successes or failures of previous attempted server changes. Embodiments of the present invention will use this change-failure rate to refine the initial Baseline risk identified in step 210 as a novel function of archived historic data that identifies success and failure rates of previous attempted server changes. This step is described in greater detail in FIG. 4.

Embodiments of the present invention may perform this step by mining one or more data warehouses that store records of information about previous server changes. This mined data may associate each recorded previous server change with a change class that identifies a category or classification associated with the previous server change.

In some embodiments, a previous server change may be associated with more than one class. A server change that, for example, comprises an update to a network software module may be classified as being associated with both a Network-Change class and a Software-Change class.

The mined data may further associate each recorded previous server change with a change closure code that identifies a result of an attempt to perform the previous server change. A closure code might, for example, identify that the attempted change failed, that it was completely successful, or that some component of the attempted change was successful.

By mining such data over a previous period of time, the one or more processors may in this step calculate a change-failure rate for each class of change that identifies a proportion of previous attempted server changes that failed in each class. This failure rate of changes that were associated with a particular class $C_j$ is expressed here as a PFC($C_j$), a "probability of failed change for changes falling within class $C_j$."

Figure 4:
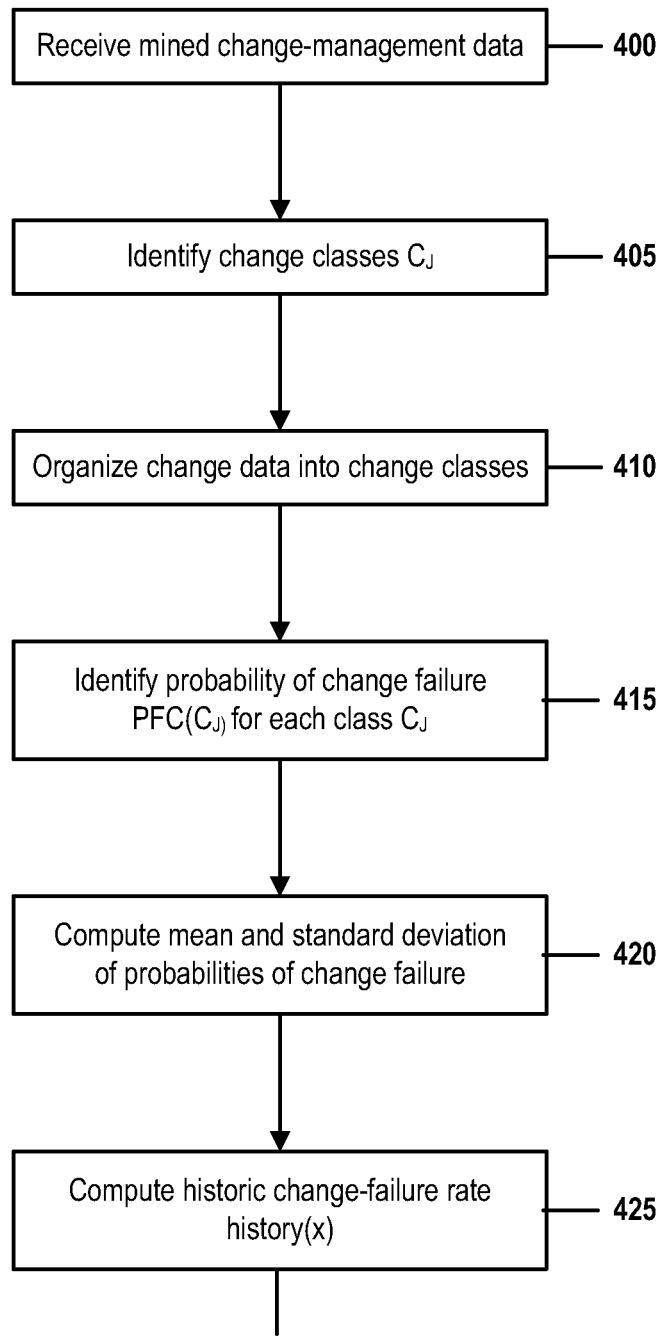
FIG. 4 is a flow chart that describes a method of determining an historic change-failure rate in accordance with embodiments of the present invention.

If the data-mining procedure of step 215 and FIG. 4 identifies N change classes $C_j$, where 1≤j≤N, then step 215 will generate N values of PFC($C_j$), one for each of the N change classes.

These derived values may then, as described in FIG. 4, be used to compute an "historic change-failure rate" that identifies and characterizes a statistical likelihood of a failure change based on extrapolations of past failures of similar attempted changes.

In step 220, the one or more processors further refine their risk computations by considering predictive factors derived from methods of predictive analytics, statistical modeling, and simulation that predict whether the server to be changed is likely to be "problematic" during the proposed change. This step is described in greater detail in FIG. 5.

This step comprises inferring patterns and relationships from information repositories that record characteristics, behaviors, and performance figures of large numbers of servers or other computing or infrastructure components. This stored information may, for example, include system logs or maintenance logs that enumerate periods during which a server or communications device became unavailable; list RAM, CPU, or disk-storage utilization figures; or aggregate server configuration or performance records.

The one or more processors in this step may analyze these inferred patterns and relationships in order to classify specific classes of components (including classes of servers) as being either problematic or non-problematic. This analysis may further comprise identifying a number of servers described in the information repositories that share relevant characteristics with the server to be changed. The processors may then identify relative numbers of such servers that may be considered problematic or considered non-problematic.

Figure 5:
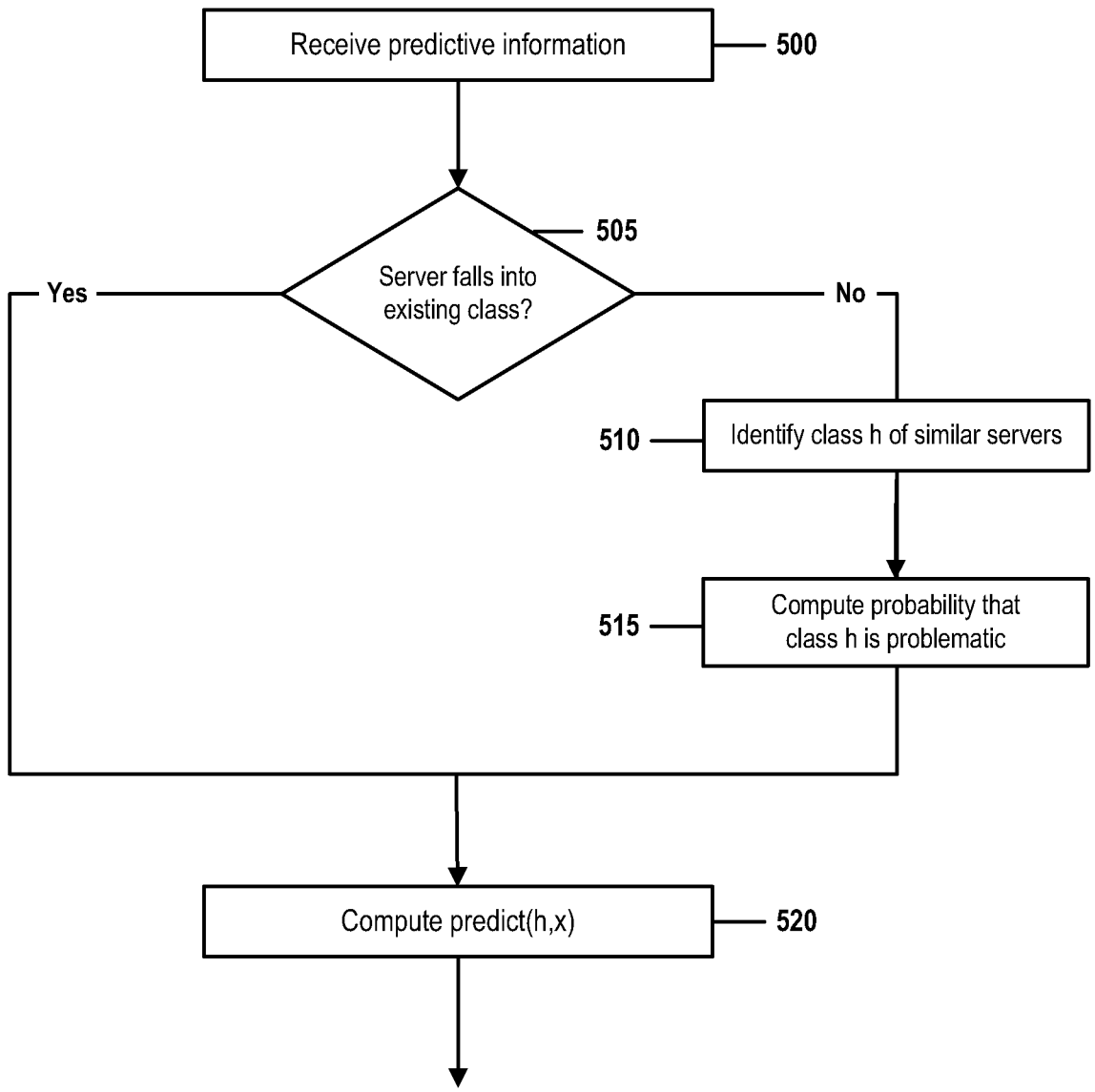
FIG. 5 is a flow chart that describes a method of determining a predictive incident probability in accordance with embodiments of the present invention.

These derived values may then, as described in FIG. 5, be used to compute an "incident probability factor" that identifies and characterizes a likelihood of a failure change based on forecasted occurrences identified by the predictive analytics.

The one or more processors may, by means known to those skilled in the art of analytics, modeling, or simulation, or as a function of expert knowledge of a system implementer, also identify remedial, collateral, or recovery actions that may be performed in steps 235 and 240 in order to lower an elevated level of risk or to mitigate impact of an adverse effect of a change failure.

In one example, the server to be changed might share with other servers that are identified as being "problematic," relevant characteristics that include a version of an operating system, RAM capacity, CPU architecture, a RAID storage configuration, a particular network interface, and certain revisions of installed middleware and application software. In step 220, the processors may then, by means of predictive analytics, evaluate simulated "what-if" scenarios that could occur during the proposed server change.

Running variations of such simulations may allow the analytics engine to identify collateral actions that may reduce a risk associated with the proposed change in each type of scenario. This reduction of risk may comprise a reduction in a probability that the change will fail, or in a reduction of a degree of impact that may result from a failure.

The information used by the processors in this step to compute the incident probability factor or to identify collateral actions would not, in general, be available to the experts from whose input the original Baseline risk was determined in step 210. Instead, this information is inferred in step 220, by known methods of analytics, from numerous predictive indicators that cannot practically be analyzed by a human evaluator, such as large, continuously updated, aggregated lists of prior incidents of server unavailability.

Embodiments of the present invention will use these predictive analytics to further refine the initial Baseline risk identified in step 210.

In step 225, the one or more processors complete their novel computation of a change risk by adjusting the original Baseline risk identified in step 210 by a function of the historic change-failure rate determined in step 215 and by a further function of the incident probability factor computed in step 220.

The resulting change risk will have been derived as a combined function of current evaluations, past recorded events, and future predictions, and may be driven by a real-time or near real-time analysis of enormous numbers of records retrieved from continuously updated information repositories.

In some embodiments, the change risk may be expressed as a percent or as a probability within the inclusive range of 0 to 1. But the exact representation of the value of the risk is not essential, so long as change risks conform to a consistent representation that allows the risks to be compared to standard or reference values.

In one embodiment, for example, a change risk may be expressed as a positive integer within the inclusive range of 1 to 5, where a change risk of 1 represents a critical risk and a change risk of 5 represents a lowest-possible degree of risk. In another embodiment, a change risk may be represented with greater granularity as a decimal number within the inclusive range of 1 to 5, expressed to three significant digits of precision.

In step 230, the one or more processors compares the change risk computed in step 225 to a threshold condition. This comparison may, for example, determine whether the change risk exceeds a predetermined threshold value, or it may determine whether a failure risk that exceeds a certain level would adversely affect, directly or indirectly, a mission-critical machine or process.

If the change risk does satisfy such an elevated-risk condition, the method of FIG. 2 continues with steps 235 and 240 and then concludes with step 245. If not, the method of FIG. 2 skips steps 235 and 240 and proceeds directly to step 245.

Step 235 is performed by the one or more processors if the processors determine in step 230 that the change risk computed in step 225 satisfies an elevated-risk condition.

In this step, the processors perform collateral or remedial activities identified in step 220 that may reduce a probability that the change will fail, or reduce a degree of impact that may result from a failure.

These activities might, for example, comprise combinations of: updating an installed operating system or application to a latest version; revising network-interface hardware; taking steps to reduce demands upon the server immediately before the change; removing the server from its network during the change; blocking mission-critical applications from accessing the server immediately after the change; allocate additional RAM or disk storage to the server; initiate an enhanced error-collection or system-logging procedure during a window of time surrounding the time of the scheduled change; rescheduling the proposed change until a specialist can be made available to supervise the change; creating system images or performing other "back-out"

activities that will facilitate a clean reversal of a failed change; or delaying the change until other related changes can be completed.

Some embodiments may comprise an automated maintenance or change-management system that, when a change is approved, may use its internal models to estimate a change risk and, if that risk is sufficiently elevated, will work with other modules of the present invention, possibly augmented by the automated system's internal database or dictionary of activities, to identify actions to be performed in steps 235 and 240.

Such an automated system tool might, for example, update a change-approval record that had been issued by a responsible organization in order to notify other interested parties of the upcoming server change. This updating might identify a degree of change risk, a list of additional stakeholders that might be affected by the change or by a change failure, or other characteristics of and extrinsic factors related to the change.

The automated system might also dispatch "virtual" staff in the form of network-based software agents, prior to a scheduled time of the change, in order to prepare the server or its operating environment for faster recovery should the change fail. This procedure may include tasks like: configuring automated back-out options, such as creating an image or recovery state of the server or its environment; or initiating a process to continuously log system utilization, configuration, and performance data.

In some cases, the one or more processors may direct performance of collateral actions that occur only during a period immediately before or after a scheduled change. This approach addresses cases in which a change risk may otherwise increase because of a longer-term unavailability of resources that might mitigate such risk.

If, for example, fast multithreaded RAM modules are temporarily in short supply, but an operating system upgrade is known to be performed more reliably on systems configured with large banks of such RAM, the one or more processors in step 235 may direct that the server to be changed be temporarily outfitted with additional RAM while the change is being performed. This type of collateral action provides an alternative solution that reduces risk without requiring the change to be postponed until RAM becomes more readily available.

In step 240, the one or more processors may initiate activities that notify users, maintenance personnel, and other interested parties of the date and character of the proposed change. The processors may also in this step notify the interested parties of the collateral activities undertaken in step 235.

In step 245, the one or more processors perform the proposed change. In embodiments shown in FIG. 2, if the Change Risk computed in step 225 was determined in step 230 to be elevated or to otherwise satisfy a high-risk condition, remedial collateral actions and notifications will have been performed by steps 235 and 240 prior to performing step 245.

In other embodiments, however, steps 235 and 240 may be performed prior to performing step 245, regardless of whether a Change Risk is determined in step 225 to be elevated or to satisfy an other high-risk condition.

In yet other embodiments, a constrained set of collateral or remedial actions may be performed prior to performing step 245 if the processors in step 225 do not identify an elevated Change risk. In embodiments that identify multiple tiers or levels of Change Risk, steps 235 and 240 may be performed regardless of a determination of risk in step 230, but the exact order and makeup of the collateral remedial or notification tasks of steps 235 and 240 may be selected as a function of which tier or aggregated level of Change Risk is identified in step 230.

Figure 3:
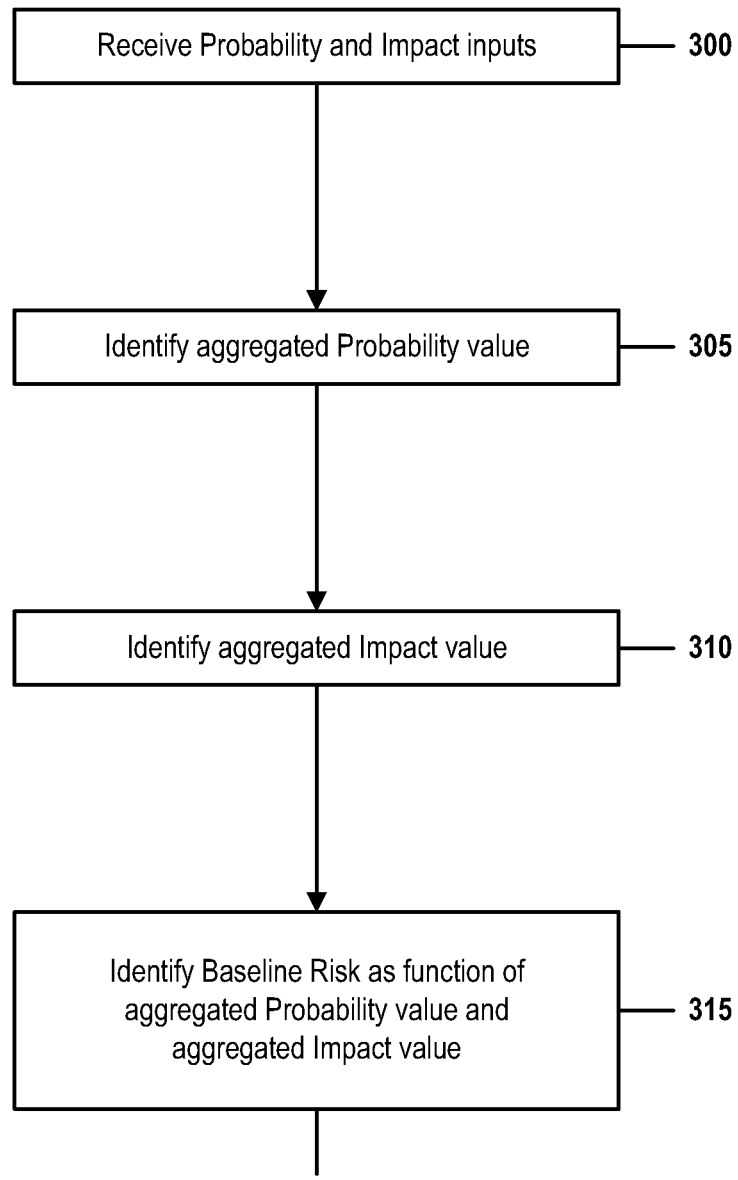
FIG. 3 is a flow chart that describes a method of performing a Baseline risk assessment in accordance with embodiments of the present invention.

FIG. 3 is a flow chart that describes a method of performing a Baseline risk assessment in accordance with embodiments of the present invention. FIG. 3 elaborates step 210 of FIG. 2 and contains steps 300-315.

In examples presented in this document, a Baseline risk value is estimated as a function of answers to survey questions submitted by end-users or experts who possess specialized knowledge about a probability of a change failure or about a severity of impact that would result from such a failure.

In other embodiments, however, a Baseline risk could be identified by other means, or by other characteristics of a current system or business environment associated with a server scheduled to undergo the change.

Baseline risk could, for example, be inferred or extrapolated as a function of a type of hardware or software comprised by the server, or by an identification of a particular technician, support team, or maintenance operation. In other cases, extrinsic factors may be taken into account, such as an anticipated load or utilization of the server, or even forecasted weather conditions.

Many other types of implementation-dependent information may be considered, either by a human being who estimates a Baseline risk as an ad hoc process or by an automated or expert system that estimates a risk of the proposed server change as a function of a current state or characteristic of the server or of its operating environment.

Regardless of the source of the information processed by the method of FIG. 3, the net result will be the same: a "baseline" first-order estimate of risk associated with a planned change that is identified as a function of an expert's or knowledgeable user's expert opinion or of another current characteristic of the server to be changed or of another infrastructure or system component related to that server or to the change.

In step 300, the one or more processors identify the Probability and Impact values received in step 200 and 205 of FIG. 2. These numeric values are represented as a set of j Probability inputs $P_1 \ldots P_j$ received in step 200 of FIG. 2 and a set of j Impact inputs $I_1 \ldots I_j$ received in step 205 of FIG. 2. In embodiments and examples described in this document the processors will have received a same number j of both Probability and Impact inputs, but in other embodiments, a number of received probability inputs may not equal a number of received impact inputs.

In our example, these Probability and Impact inputs will have been identified as a function of answers to a series of survey questions that measure a surveyed party's opinions about factors that may affect a probability of or an impact of a change failure. Such questions might, for example, comprise the questions: "How often has your organization performed similar changes in the past?", "How complex is the software application to be upgraded?", or "Would a service outage of this server adversely affect any mission-critical application?"

These questions fall into two corresponding categories: Probability and Impact. The answers to each question will be scored on an implementation-dependent numeric or other type of scale and, in some embodiments, the Probability questions may use a different scale than the Impact questions.

In one example, a set of survey questions may comprise eight Probability questions, the answers to each of which may indicate a degree of probability of a change failure that ranges from 1 (a greatest probability) to 3 (a lowest probability).

The set of survey questions may further comprise six Impact questions, the answers to each of which may indicate a degree a degree of impact resulting from a change failure that ranges from 1 (a greatest impact) to 4 (a lowest impact).

In this example, the one or more processors may receive in this step eight Probability values $P_1 \ldots P_8$ and six Impact values $I_1 \ldots I_6$. Each Probability value may equal a value of 1, 2, or 3, and each Impact value may equal a value of 1, 2, 3, or 4.

In step 305, the one or more processors selects an aggregated value of risk probability identified by the received Probability values. This aggregated value may be selected by any means known in the art, such as a statistical analysis, a comparison of the received values to certain reference values, by selecting a greatest or least value of the received values, by selecting a median or mean of the received values, or by applying a weighting or bias to the received values.

In embodiments described herein, an aggregated risk of probability is selected as a minimum value of the received Probability values.

If, for example, eight received Probability values $P_1 \ldots P_8$ comprise an ordered set of values {2, 3, 3, 2, 3, 2, 3, 3}, then the aggregated risk of probability would be equal to a value of 2.

In step 310, the one or more processors selects an aggregated value of risk impact identified by the received Impact values. This aggregated value may be selected by any means known in the art, such as a statistical analysis, a comparison of the received values to certain reference values, by selecting a greatest or least value of the received values, by selecting a median or mean of the received values, or by applying a weighting or bias to the received values.

In embodiments described herein, an aggregated risk of impact is selected as a minimum value of the received Impact values.

If, for example, six received Impact values $I_1 \ldots I_6$ comprise an ordered set of values {2, 4, 4, 4, 1, 4}, then the aggregated risk of impact would be equal to a value of 1.

In step 315, the one or more processors identifies a Baseline risk value as a function of the aggregated probability and risk values identified in steps 305 and 310.

This identification of a Baseline risk may be performed by means of any statistical or analytical method known to those skilled in the art, or performed as a function of expert knowledge of the server to be changed, its operating or networking environment, the type of change, a priority or goal of a business or other entity that owns or operates the server, an end-user of the server, or any other implementation-dependent factor.

In embodiments of the present invention described in FIG. 3, this identification of a Baseline risk is performed by means of a table lookup. This lookup identifies a distinct value of a Baseline risk as a function of a combination of a first value of an aggregated probability and a second value of an aggregated impact.

Consider, for example, the following Baseline Risk lookup table.

|  | Impact = 1 | Impact = 2 | Impact = 3 | Impact = 4 |
|---|---|---|---|---|
| Prob = 1 | 1 | 1 | 2 | 3 |
| Prob = 2 | 1 | 2 | 3 | 4 |
| Prob = 3 | 2 | 3 | 4 | 4 |

In our preceding example, the one or more processor in step 305 identified an aggregated probability value of 2 and in step 310 identified an aggregated impact value of 1. Cross-referencing these values in the Baseline Risk lookup table yields a Baseline Risk value of 1.

Similarly, if the one or more processor in step 305 had identified an aggregated probability value of 3 and in step 310 had identified an aggregated impact value of 4, cross-referencing these values in the Baseline Risk lookup table would have yielded a Baseline Risk value of 4.

The values identified by entries of a Baseline Risk lookup table may be implementation-dependent, or may be a function of industry standards or references. In some embodiments, entries of a Baseline Risk lookup table may be selected by industry or business experts, or may be part of an integrated effort that comprise an integrated design of both survey questions and lookup-table questions. Because this Baseline Risk is merely a starting point for a change-risk analysis of the present invention, a precise determination of risk need not be performed at this step. In fact, because methods presently known in the art may not determine a change risk with any greater precision than would the simple table lookup described here, one benefit of the present invention is its ability to compute a far more accurate estimate of change risk despite starting with an imprecise initial estimate, such as the Baseline Risk identified here.

The important consideration here is that entries of the lookup table be chosen so as to identify a Baseline Risk as a logical function of aggregated probability and impact values. If, for example, the processors have identified a lower probability of a failure and a lower impact resulting from such a failure, a table lookup should generally identify a lower Baseline Risk value than it would if the processors had identified a higher probability of failure and a higher impact.

At the conclusion of step 315, methods of the present invention continue with the method of FIG. 4, which describes step 215 of FIG. 2 in greater detail.

FIG. 4 is a flow chart that describes a method of determining an historic change-failure rate in accordance with embodiments of the present invention. FIG. 4 elaborates step 215 of FIG. 2 and contains steps 400-425.

In step 400, the one or more processors mine one or more data warehouses or other information repositories for content that dates back a predetermined period of time. This content may identify and characterize previously attempted changes and the results of such changes.

This content may, in order to allow the processors to infer statistically relevant meaning from the mined data, comprise very large numbers of records collected from many disparate sources over an extended period of time.

The content may comprise any sort of information that may be deemed to help identify characteristics of a server that underwent a change attempt, of the attempted change itself, of a result of the attempted change, or of an extrinsic factor associated with the server, the change, or the result.

In some embodiments, each change attempt identified in the mined data may be characterized by a change-class code and by a closure code, where a change-class code categorizes the attempted change as belonging to a larger classification or type of change, and the closure code may identify a result of an attempt to implement the change. In an embodiment in which a change-class code is not associated with every change attempt servers identified by the mined data will be classified by other means in step 405.

In step 405, the one or more processors organize the data mined in step 400 so as to organize each record of data into categories based on classifications of attempted changes. The processors may select a set of categories as a function of the data stored in the data warehouses or other information repositories, as a function of the types of server changes that may be analyzed by an embodiment of the present invention, as a function of a characteristic of the server to be changed, or by other implementation-dependent factors.

An embodiment might, for example, identify 65 change categories that include network-interface card upgrades, operating-system upgrades, RAM expansion, rotating-storage to solid-state storage conversions, routine maintenance, security upgrades, and provisionings of a virtual resource.

In examples described in this document, the one or more processors in this step may identify J change classes $C_1 \ldots C_J$, each of which identifies one such class. In some cases, these change class classifications may have already been specified by the content received in step 400, but in other cases, the one or more processors must identify or infer change classes from the received content and possibly as a function of extrinsic data or contextual information.

In step 410, the one or more processors organize the content received step 400 into groups as a function of the J classifications $C_J$ identified in step 400 or 405. This organization may be performed as a function of previously defined classifications of the received content, or as a function of metadata, contextual information, or other characteristics of each element of data read in step 400.

In one example, the one or more processors in this step might associate a change class "RAM upgrade" with records of data received from a database repository of information that are related to server changes in which banks of computer memory are identified as component parts to be procured prior to the change in order to perform the change.

In some embodiments, a change that is identified or characterized by content read in step 400 may be associated with more than one change classification. A operating-system upgrade may, for example, comprise a software installation, a memory upgrade, a graphics-board upgrade, and installation of larger, faster hard drives.

In step 415, a probability of failure change PFC( ) is computed for each of the J change classes $C_J$. This computation is performed as a function of closure codes received in step 400 and of the classifications of received data performed in step 410.

If, for example, a change class $C_{11}$ "Increase RAM Speed" is associated with 24,000 attempted server changes, the one or more processors in this step might identify a closure code associated with each of those server changes.

If 2,000 of those closure codes indicate a change failure, then a probability of failure change for class $C_{11}$ PFC($C_{11}$) over the previous 24 months might be computed as a ratio between a total number of successful changes associated with class $C_{11}$ over the previous 24 months and a total number attempted changes associated with class $C_{11}$ and attempted during the same time period. In this example:

$$PFC(C_{11}) = (24{,}000 - 2{,}000)/24{,}000 = 22{,}000/24{,}000 = 91.7\%$$

In some embodiments, the one or more processors may compute a PFC value in this manner for each of the J change classes $C_J$. In other embodiments, in which a method of FIG. 4 is concerned primarily with a subset of changes classes associated more closely with the server to be changed, the processors in this step may compute PFC values only for that subset of changes.

In some embodiments, a value of PFC may be a scaled or weighted numeric value, rather than a percent. An embodiment may, for example, express a probability of a failure change as a decimal numeric value within an inclusive range of 1 to 5 or as a code of a ranked hierarchy of alphanumeric codes.

In step 420, the one or more processors compute a mean and a variance of the J change classes $C_J$. These parameters are performed by standard statistical methods known in the art.

The mean m of the PFC values of the J change classes $C_1 \ldots C_J$ is computed as a function of a sum over an index range n={1 ... J}:

$$m = 1/J * \Sigma PFC(C_n)$$

The variance $s^2$ of the PFC values of the J change classes $C_1 \ldots C_J$ is computed as function of a sum over an index range n={1 ... J}:

$$s^2 = 1/J * \Sigma (Pfc(C_n) - m)^2$$

In step 425, the one or more processors compute a historic change-failure rate history(x) for the proposed server change.

In this equation, x represents a continuously variable measure of how problematic the proposed change may be, as a function of the PFC( ) values computed in step 415. The history(x) function is a normalized adjustment that will be applied to the Baseline Risk value computed in step 210 in order to account for a degree of risk that may be inferred as a function of x.

In an exemplary type of representation used in examples described in this document, x is represented as a percent value. If, for example, x is computed to have a value of 0.02, then a value of 2, representing a 2% probability, is used in the subsequent computations.

In embodiments and examples described in this document, x is limited for pedagogical purposes to non-negative numeric values, or to a scaled range of values that falls within an inclusive range of non-negative integer values. But in other embodiments, x may be expressed as any scaled or weighted numeric value.

If the proposed server change fits into only one of the change classes $C_J$ identified in step 405, a value of x for that change is set equal to the probability of a failure change for that class PFC($C_J$).

$$x = PFC(C_J)$$

If the proposed server change may be categorized by more than one change class, a corresponding value of x may be computed by a reverse probability formal. If, for example, the server change belongs to two classes $C_1$ and $C_2$, PFC($C_1$)=0.4, and PFC($C_2$)=0.8, then a value of x associated with proposed server change=1−(1−0.8)*(1−0.4)=0.88. As described above, X will be represented in subsequent computations as a percent-normalized value of 88 by multiplying the 0.88 decimal value by 100.

In a more general sense, if a server change is associated with N change classes that correspond respectively to N probabilities $PFC(C_1) \ldots PFC(C_N)$, then x may be determined as a function of a product of reverse probabilities of each PFC( ):

$$x = 1 - \prod(1 - PFC(C_J)), J = 1 \ldots N$$

$$x = 100 * x$$

Given a value of x, history(x) is determined by means of a two-pronged function:

$$history(x) = \begin{cases} 0 & x \in [0, m) \\ 1 - e^{-\frac{(x-m)^2}{2s^2}} & x \in [m, \infty) \end{cases} \quad (1)$$

Equation (1) shows that the history(x) function has a value of zero up to the mean value of $PFC(C_J)$ across all J change classes. But if a probability of a failure change is greater than average (that is, if an $x_J$ for a change class $C_J$ exceeds the mean value m), then the change failure rate history(x) becomes non-zero and rises monotonically as an exponential function of its corresponding PFC value.

In other words, if a class of changes is associated with a probability of a failure change that is less than or equal to a mean probability for all classes then a Baseline risk for a proposed server change that falls into that class undergoes no adjustment as a function of that class's historic failure-change rate.

But if that class of changes is associated with a probability of a failure change that is greater than to the mean, then a Baseline risk computed for a proposed server change that falls into that change class will be adjusted as a function of a nonzero historic failure-change rate.

FIG. 5 is a flow chart that describes a method of determining a predictive incident probability in accordance with embodiments of the present invention. FIG. 5 elaborates step 220 of FIG. 2 and contains steps 500-520.

In step 500, the one or more processors receive information from a predictive source, such as an analytics engine, a statistical modeling application, or a computerized simulation program.

This information may have been received in response to a request for predictive information related to the proposed server change. This requested or received information may have been chosen as a function of characteristics or the server to be changed, of characteristics of the change itself, or of an extrinsic factor associated with the server or the change.

The received information may be derived from a predictive model or simulation that the source generates as a function of large amounts of data and logic. An analytics engine, for example, may infer patterns and meanings from knowledgebases that organize and identify relationships among large numbers of data elements that represent concepts and ideas.

In embodiments of the present invention, such a predictive source may provide predictive data that can be used to forecast future events related to the proposed change. Here, the predictive source may infer such predictive data from contents of warehouses or distributed repositories of stored data related to server changes, the components upon which they are performed, results of such changes, preparatory or remedial actions taken in relation to such changes and the results of such preparatory or remedial actions, extrinsic factors related to such changes, and other information related to server changes.

Such stored data might, for example, comprise information about a server's history of service outages, server utilization figures, server configurations, factors that may be correlated to change success rates, or characterizations of results of various types of change attempts.

The predictive source may infer from this stored data, using known techniques of predictive analytics, statistical analysis, computer modeling, or simulation techniques, to sort servers associated with the stored data into k categories $h_k$ and to characterize each server category k as being either problematic or non-problematic.

These categorizations and characterizations may be performed as complex functions of stored information associated the servers described by the source's stored data, and may help predict how likely it is that a server that shares characteristics with a particular category of servers will be problematic during a particular type of change. In some embodiments, a prediction may be based on an identification of a degree of similarity between the server to be changed and a category of similar servers that the predictive source has identified as being problematic or non-problematic during changes that may be similar to the planned change.

As described in FIG. 2, the predictive source may further predict results of collateral actions that may be performed to minimize a probability of a failure when attempting to perform a change upon a particular category or classification of server; or to minimize an impact of such a failure upon users, businesses, other systems, or other associated entities.

In some cases, a collateral action may be performed, as a function of the source's predictions, during steps 235 and 240 of FIG. 2 as preventive measures, before an actual change is performed. In other cases, they may be performed only after a failure has occurred. Collateral actions may also be performed during a limited window of time surrounding a scheduled time of a change, or may be performed as a function of a degree of change risk associated with a planned change.

In step 505, the one or more processors determine whether the server to be changed falls within any class h identified in step 500. If a class $h_k$ of the identified classes identifies servers that are sufficiently similar to the server to be changed, then the method of FIG. 5 continues with step 520. But if none of the identified classes identifies servers that are similar to the server to be changed, then the method of FIG. 5 performs steps 505 and 510 in order to synthesize a class h of the server to be changed before continuing with step 520.

If the processors determine that steps 505 and 510 must be performed, it is imperative that these steps be performed in a time frame that provides as close to real-time response as possible, so that the predictive-data adjustment of function predict(h,x) of step 220 of FIG. 2 is synchronized with the historic rate-change adjustment of function history(x) of step 215 and with the Baseline risk identified in step 210. Significant delay between any pair of these steps will result in a Change Risk computation in step 225 that attempts to combine parameters that were not derived under similar boundary conditions.

In step 510, the one or more processors identify a new class h of servers similar to the server to be changed. This new class may be a function of a set of characteristics that are deemed to be relevant to the server change. Such characteristics may, for example, comprise a combination of an operating-system provider, an operating-system version, a purpose of a change, a category of business function performed by server, and a network operating system.

In step 515, the one or more processors interpret the predictive information received in step 500 to determine a probability that the server to be changed will be problematic.

Each server identified by the predictive data received in step 500 is associated with a classification as being either problematic or non-problematic, and is further associated with set of characteristics similar to the characteristics used by the one or more processors in step 510 to synthesize a category h for the server to be changed. In step 515, the one or more processors select from the received data a list of all servers that share a sufficient number of characteristics with the server to be changed to allow those servers to be identified as falling into category h. The processor then identify a subset of these selected servers that have been classified by the predictive source as being problematic.

If, therefore, the processors in this step identify n servers that share enough characteristics with the server to be changed to fall into the category h associated with that server, and if k of those servers are classified as problematic by the predictive source, then the processors identify a weighting factor k/n that identifies how potentially problematic the server to be changed will be, as a function of the received predictive data.

In one example, if 800 servers identified by the predictive source are sufficiently similar to the server to be changed to be considered to be in the same class as that server, and if 200 of those servers are classified by the predictive source as being problematic, the one or more processors identify a degree of probability that the proposed server change will be problematic equal to 25% (200/800).

This "k/n" weighting factor will be used in step 520 to compute a value of predictive incident probability function predict(h,x).

In step 520, the one or more processors use compute predict(h,x) for a server category h and for the value of x (the historically derived measure of how problematic the change may be) derived in step 425 of FIG. 4.

Function predict(h,x) returns a value according to the following rules:

i) if a class h of the server to be changed is identified by the predictive source as being non-problematic, then predict(h,x)=0;

ii) if a class h of the server to be changed is identified by the predictive source as being problematic, then:

predict(h,x)=0, $x \in [0, m+s]$ predict(h,x)=0.5+p, $x \in (m+s, \infty)$ where m is the mean of the PFC values of the J change classes $C_1 \ldots C_J$, s is the standard deviation of the PFC values of the J change classes $C_1 \ldots C_J$, and p is a value returned by the function:

p=1−history(m+3*s)

iii) if a class h of the server to be changed was synthesized in step 510 because h was not identified by the predictive source, then predict(h,x)=0, $x \in [0, m+s]$ predict(h,x)=k/n(0.5+p), x in $\in (m+s, \infty)$ This computed value of predict(h,x), along with the value of history(x) computed by the method of FIG. 4 will be used in step 225 of FIG. 2 (and by the method of FIG. 6) to adjust the Baseline Risk identified in step 210, in order to identify a final Change Risk.

Figure 6:
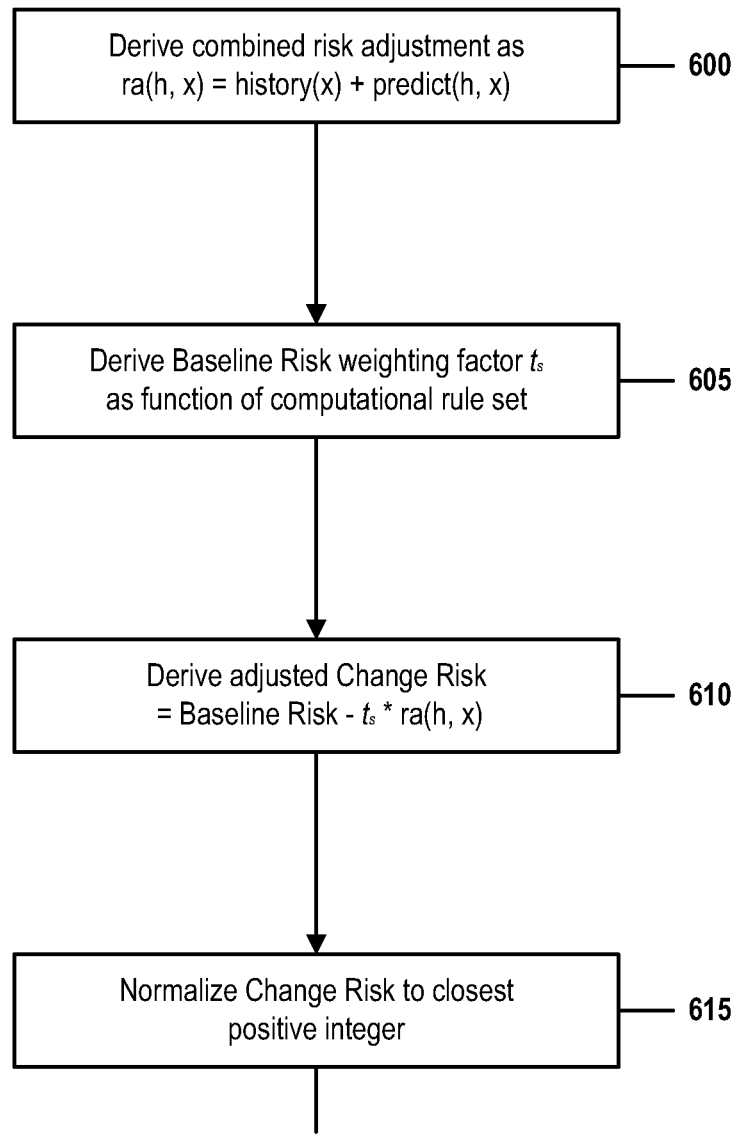
FIG. 6 is a flow chart that describes a method of computing a Change Risk as a function of a baseline risk, as adjusted by an historic change-failure rate and a predictive incident probability, in accordance with embodiments of the present invention.

FIG. 6 is a flow chart that describes a method of computing a Change Risk as a function of a baseline risk, as adjusted by an historic change-failure rate and a predictive incident probability, in accordance with embodiments of the present invention. FIG. 6 elaborates step 225 of FIG. 2 and contains steps 600-615.

In step 600, the one or more processors perform a Risk Adjustment on the Baseline Risk value identified in step 210, as a function of the historic change-failure rate history (x) identified in step 215 and as a further function of the predictive incident probability predict(h,x) identified in step 220.

These risk adjustments, in their simplest form, may be performed by the computation:

ra(h,x)=history(x)+predict(h,x)

Expanding these functions to their component values produces the following table of ra values for combinations of values of h (where 1 indicates that h is a problematic class and 0 indicates that it is non-problematic) and values of x within ranges demarcated by numbers of standard deviations from the mean PFC value m:

| x | [0, m] | (m, m + s] | (m + s, m + 2 s] | (m + 2 s, m + 3 s] | (m + 3 s, ∞] |
|---|---|---|---|---|---|
| h = 0 | 0 | 0 | 0 for history(x) ≤ 0.5 | 1 | 1 |
| h = 1 | 0 | 1 | 1 | 1 | 2 |

Note that this table identifies higher risk values for combinations of x and h that identify a lower number of changes. The cell that indicates the highest ra value (ra=2), for example, is associated with values of x that fall at least three standard deviations from the mean.

In step 605, the one or more processors derive a final $t_s$ adjustment parameter that is used to weight the initial Baseline Risk identified in step 210. In embodiments described in this document, we refer to this parameter as a Baseline Risk weighting factor. Although exact numeric adjustments of a derivation of the $t_s$ parameter may at least in part be implementation-dependent, in embodiments and examples described in this document, $t_s$ is derived by means of the following rules (assuming that values of Baseline Risk are expressed as integer values in the inclusive range of 1-4):

If the Baseline Risk>3, then $t_s$=1

If the Baseline Risk=3, then $t_s$=history(m+s)

If the Baseline Risk=2, then $t_s$=history(m+2s)

If the Baseline Risk=1, then $t_s$=0

In step 610, the one or more processors computes the final adjust Change Risk value by means of the equation:

Change Risk=Baseline Risk−($t_s$*ra(h,x))

In step 615, the Change Risk value computed in step 610 may be quantized to a nearest positive integer. This quantization allows the Change Risk value to be forwarded to and more easily processed by external modules that record, track, manage, or resolve other change-management issues related to server changes.

The method of the present invention then continues with step 230 of FIG. 2.

Methods and systems described in FIGS. 1-6 may be further illustrated by the following concrete example of a typical operation of an exemplary embodiment of the present invention.

In this example, a business has planned a server change that is associated with the classes "Application" and "Operating System."

As described in steps 200 and 205 of FIG. 2 and step 300 of FIG. 3, the one or more processors receives sets of Probability and Impact inputs culled from sets of user-survey questions.

In this example, the user survey comprises nine Probability questions, each of which may be answered by a user input that identifies a numeric Probability input value of 1, 2, or 3.

These exemplary Probability questions comprise:
1. How many times have you performed a server change similar to the planned change?
   <option value="1">Never
   <option value="2">Less than 5 times
   <option value="3">I have performed it regularly
2. If you performed a similar change, did it fail?
   <option value="3">No
   <option value="2">Don't know
   <option value="1">Yes
3. If you performed a similar change, were the results of that change tested?
   <option value="3">Yes, fully tested with success
   <option value="3">No, this is a test change
   <option value="1">No
   <option value="2">Partially tested
4. How many support groups or competencies are involved with or would be affected by the planned change?
   <option value="3">One
   <option value="2">Two
   <option value="1">More than two
5. How complex is the implementation of the planned change?
   <option value="3">Straightforward implementation
   <option value="2">Medium complexity
   <option value="1">High complexity
6. How complex would it be to reverse the effects of the change, should the change produce undesired results?
   <option value="3">Easy
   <option value="2">Difficult
   <option value="1">Not possible
   <option value="1">Very Complex and/or lengthy
7. How much time will be needed to prepare for the change?
   <option value="3">up to 1 day
   <option value="2">more than 1 day, less than a week
   <option value="1">1 week or more
8. How significantly would a change failure impact you?
   <option value="3">No impact
   <option value="2">Risk of unplanned service outage resulting in Incident(s)
   <option value="1">Risk of unplanned service outage resulting in Major Incident
9. Does support documentation exist that could be used to manage the planned change?
   <option value="3">the change follows a repeatable and well defined, well-documented procedure
   <option value="2">Specific, detailed documentation exists (e.g. runbook) to support the required change activity
   <option value="1">No documentation exist In this example, one set of these questions is answered in the following way:
1. How many times have you performed a server change similar to the planned change?
   <option value="3">I have performed it regularly
2. If you performed a similar change, did it fail?
   <option value="3">No
3. If you performed a similar change, were the results of that change tested?
   <option value="3">Yes, fully tested with success
4. How many support groups or competencies are involved with or would be affected by the planned change?
   <option value="3">One
5. How complex is the implementation of the planned change?
   <option value="3">Straightforward implementation
6. How complex would it be to reverse the effects of the change, should the change produce undesired results?
   <option value="3">Easy
7. How much time will be needed to prepare for the change?
   <option value="3">up to 1 day
8. How significantly would a change failure impact you?
   <option value="3">No impact
9. Does support documentation exist that could be used to manage the planned change?
   <option value="3">the change follows a repeatable and well-defined, well-documented procedure Answers to these questions are each rated from 1 (highest probability) to 3 (lowest probability) and, in this example, all questions were answered as with choice that identified low probabilities of "3." The aggregated Probability value, which is selected as the minimum value of a set of received probabilities, is thus identified in step 305 to be equal to 3.

Similarly, in this example, the user survey further comprises seven Impact questions, each of which may be answered by a user input that identifies a numeric Impact input value of 1, 2, 3, or 4.

These exemplary Impact questions comprise:
1. How significant is the business consequence of the planned change?
   <option value="4">None or very Minor
   <option value="3">Some business consequence (Medium)
   <option value="2">Major
   <option value="1">Critical
2. What is the potential business impact of a change failure?
   <option value="4">Non-critical functions, no disruption
   <option value="3">Minor service disruption to non-critical function
   <option value="2">Critical business function, service disruption with work-around
   <option value="1">Critical business function, service disruption
3. How many users will be affected during implementation of the change?
   <option value="4">1-10%
   <option value="3">11-50%
   <option value="2">51-79%
   <option value="1">80-100%
4. How many configuration settings will be affected by the change?
   <option value="4">One
   <option value="3">More than one, less than 3
   <option value="2">More than 3
   <option value="2">A critical configuration setting will be affected
   <option value="1">An extensive number (all systems of one application or business function)

5. At what time is the change scheduled?
<option value="4">Outside of regular business hours
<option value="4">A low-impact low-risk time during regular business hours
<option value="3">A regularly scheduled maintenance window
<option value="2">During peak business hours
6. Will the change necessitate of outage of user service?
<option value="4">No outage (non-disruptive change)
<option value="3">Change is scheduled outside availability window of the application
<option value="2">Planned outage to one application
<option value="1">Planned outage to multiple applications
7. Are resources affected by the change deployed on a shared infrastructure?
<option value="4">No
<option value="4">Yes, but on a dedicated segment with n risk of impacting multiple accounts
<option value="3">Yes, affecting a shared service used by multiple customers in a single region
<option value="2">Yes, affecting a shared service used by multiple customers in multiple regions In this example, one set of these Impact questions is answered in the following way:
1. How significant is the business consequence of the planned change?
<option value="4">None or very Minor
2. What is the potential business impact of a change failure?
<option value="4">Non-critical functions, no disruption
3. How many users will be affected during implementation of the change?
<option value="4">1-10%
4. How many configuration settings will be affected by the change?
<option value="4">One
5. At what time is the change scheduled?
<option value="4">Outside of regular business hours
6. Will the change necessitate of outage of user service?
<option value="4">No outage (non-disruptive change)
7. Are resources affected by the change deployed on a shared infrastructure?
<option value="4">Yes, but on a dedicated segment with n risk of impacting multiple accounts Answers to these Impact questions are each rated from 1 (highest impact) to 4 (lowest impact) and, in this example, the answers to the seven questions identify impact values of 4. The aggregated Impact value, which is selected as the minimum value of a set of received probabilities, is thus identified in step 310 to be equal to 4.

In step 315, the processors identify a corresponding Baseline Risk by performing a lookup in the Baseline Risk lookup table.

|          | Impact = 1 | Impact = 2 | Impact = 3 | Impact = 4 |
|----------|------------|------------|------------|------------|
| Prob = 1 | 1          | 1          | 2          | 3          |
| Prob = 2 | 1          | 2          | 3          | 4          |
| Prob = 3 | 2          | 3          | 4          | 4          |

Based on a Probability input of 3 and an Impact input of 4, the table identifies a Baseline Risk equal to 4.

As described in FIG. 4 and in step 215 of FIG. 2, a historic change-failure rate is determined as a function of a retrieved set of historical change data, augmented by a set of service-management guidelines. Here, according to automated methods described in step 405 of FIG. 4, the system identifies 17 change classes. As in other embodiments of the present invention, the historical change data described here comprises a very large set of continuously updated records. Such data can be read, interpreted, and organized quickly enough to enable that data to be organized into valid classes, as described by step 410 of FIG. 4, only if that method is implemented as an automated computerized process.

Similarly, a computerized implementation of the method of step 415 of FIG. 4, associates with each of the 17 change classes $C_J$ a corresponding probability of failure change $PFC(C_J)$.

| Class # | Class Name | PFC |
|---------|------------|------|
| 1  | Application            | 1.05 |
| 2  | BackupRestore          | 0.82 |
| 3  | ConfigurationManagement| 1.50 |
| 4  | DB                     | 0.00 |
| 5  | EnterpriseChange       | 1.03 |
| 6  | Facilities             | 0.7  |
| 7  | Hardware               | 1.03 |
| 8  | IDAdmin                | 1.06 |
| 9  | IMAC                   | 0.96 |
| 10 | ITServices             | 1.36 |
| 11 | Network                | 0.91 |
| 12 | Operating System       | 0.90 |
| 13 | Other                  | 0.63 |
| 14 | Process                | 0.49 |
| 15 | SAD                    | 0.35 |
| 16 | Security               | 0.58 |
| 17 | Software               | 1.09 |

By means of procedures described in step 420 of FIG. 4, these PFC values yield a mean m and a standard deviation s of the PFC probabilities:

$$m = 1/n \Sigma PFC(C_J) = 1/17 * 14.46 = 0.85 \text{ and}$$

$$s^2 = 1/n \Sigma (Pfc(cj) - m)^2 = 1/17 * 2.15 = 0.127$$

$$s = SQRT(0.127) = 0.36$$

By means of procedures described in step 425 of FIG. 4, these computed values are then used to identify a value of x, the measure of how problematic the proposed change will be, as a function of the PFC values of the "Application" class 1 and "Operating System" class 12 to which the change belongs.

As shown in the above table, PFC(Application)=1.05%=0.0105 and PFC(Operating System)=0.90%=0.009. Substituting these values into the equation described in step 425 yields:

$$x = 1 - ((1 - PFC(C_1)) * (1 - PFC(C_{12})))$$

$$x = 1 - (1 - 0.0105) * (1 - 0.009) = 1 - 0.9895 = 0.0194055 = 1.94055\%$$

Because this value of x is greater than the mean m value of 0.851 these computed values are then used to compute an historic change-failure rate history(x) as:

$$1 - e^{-\frac{(x-m)^2}{2s^2}}$$

$$\begin{aligned}
\text{history}(x) &= \text{history}(1.94055) \\
&= 1 - e^{**}(-(1.94055 - 0.85)^2 / 2^*(0.36)^2) \\
&= 1 - e^{**}(-(1.1892993025) / (0.2592)) \\
&= 1 - e^{**}(-4.5883460744598) \\
&= 1 - 0.010169664339216 \\
&= 0.9898
\end{aligned}$$

As described in FIG. 5 and in step 220 of FIG. 2, a predictive incident probability is determined as a function of predictive inferences generated by a predictive analytics engine. These inferences organize a large body of data related to past server-change attempts, organizes that data into categories based on a type of server to be changed, and characterizes each category (and thus each type of server) as likely to be either problematic or non-problematic when attempting to subject it to future changes.

In this example, the server to be changed does not fall within any of the server categories identified by the predictive analytics engine. The system thus aggregates a set of characteristics of the server to be changed in order to identify its overall system configuration. In this example, those characteristics may be summarized as:

Hostname: ADELIA23

OS provider: Microsoft

OS name: Windows

OS version: 2008

Purpose: Application

Environment: Production

This information may be used to identify the predictive incident probability predict(h,x) of the server h to be changed by means of the equations described in step 520 of FIG. 5.

As described in steps 510 and 515 of FIG. 5, the system then determines that the predictive analytics engine has identified 1228 servers that share the most relevant of these attributes with the server to be changed, 76 (6.19%) of which the engine characterizes as "problematic." Predict(h,x) may then be derived by means of the procedure:

$$\begin{aligned}
p &= 1 - \text{history}(m + 3s) \\
&= 1 - e^{**}(-(3s)^2 / (2s^2)) \\
&= 1 - e^{**}(-9/2) \\
&= 1 - 0.01108 \\
&= 0.9889
\end{aligned}$$

$$\begin{aligned}
\text{predict}(h, 1) &= 0.0619^*(0.5 + p), \text{ where } p = 1 - \text{history}(m + 3^*s) \\
&= 0.0619^*(0.5 + 0.9889) \\
&= 0.0619^* 1.4889 \\
&= 0.0921
\end{aligned}$$

As described in FIG. 6 and in step 225 of FIG. 2, the system then determines a value of a Change Risk as a function of the values derived in the preceding steps.

The initial risk adjustment factor ra(h,x) is computed by means of the equation described in step 600 of FIG. 6:

$$\begin{aligned}
ra(h, x) &= \text{history}(x) + \text{predict}(h, x) \\
&= 0.9898 + 0.0921 \\
&= 1.0819
\end{aligned}$$

A Baseline Risk weighting factor $t_s$ is determined by means of the rules described in step 605.

If the Baseline Risk>3, then $t_s=1$

If the Baseline Risk=3, then $t_s=\text{history}(m+s)$

If the Baseline Risk=2, then $t_s=\text{history}(m+2s)$

If the Baseline Risk=1, then $t_s=0$

Because the Baseline Risk is in this example equal to a value of 4, $t_s=1$.

Finally, the Change Risk is determined as a function of the equation o step 610:

$$\begin{aligned}
\text{Change Risk} &= \text{Baseline Risk} - (t_s^* ra(h, x)) \\
&= 4 - 1^* 1.0819 \\
&= 2.9181
\end{aligned}$$

As described in step 615, this Change Risk value is then rounded to the nearest integer value, resulting in a very low Change Risk value of 3.

In this example, the Change Risk is too low to trigger performance of the collateral actions described in steps 235 and 240, in embodiments that perform collateral actions only when step 230 of FIG. 2 detects an elevated or otherwise critical Change Risk value. But in other embodiments, collateral procedures may be performed prophylactically, regardless of Change Risk value.

As described in step 235 of FIG. 2, these collateral actions might comprise recommended steps that the predictive analytics engine has inferred to be likely to reduce a probability of a change failure or of an impact of a failure. These actions may, in some embodiments, be implemented automatically, either immediately or within a predetermined window of time surrounding the planned time of the change.

These implementation-dependent actions in this case comprise simple infrastructure tweaks, such as allocating additional memory modules and disk storage to the server to be changed. They also include: a temporary policy change that permits automated provisioning of additional cloud resources to the server during the change; scheduling a full system backup that creates a system image that may be used to reverse effects of a failed change; and an immediate initiation of deep system performance and utilization logging that will persist through the time of the change.

As described in step 240 of FIG. 2, the system next undertakes further collateral actions intended to increase awareness of the planned change. Because the change planned in this example requires support from business units responsible for storage administration, platform support, network operations, and service delivery management, the system here modifies contents of a generally accessible Change Record such that those business functions receive notice that their availability or direct participation will be required during the change.

Because a Change Record, in this context, may be used as a means of notifying personnel throughout the business of the impending change, the system may further modify the Change Record to notify subject-matter experts in different departments of the date and nature of the change. This notification will enable management, first-responder technical specialists, and backup/recovery personnel to better schedule resources and anticipate emergency calls during the change.

At the conclusion of these steps, the system, as described in step 245 of FIG. 2, performs the actual move.

What is claimed is:

1. A server-management system comprising a processor, a memory coupled to the processor, and a computer-readable hardware storage device coupled to the processor, the storage device containing program code configured to be run by the processor via the memory to implement a method for mitigating a likelihood and impact of a server-reconfiguration failure, the method comprising:

the system receiving data submitted by users in response to a set of questions,
where each element of received data provides user-specific information from which can be inferred either a probability that the planned server reconfiguration will fail or a degree of impact on a business function that would result from a failure of the planned server reconfiguration, and
where the planned server reconfiguration comprises performing a first type of reconfiguration task on a server of a first class of virtual server, where a selection of the first class is dependent on an identification of the business function and on a further identification that the server performs the identified business function;

the system computing, as a function of the received data, a baseline failure rate that identifies a user-defined probability that the planned server reconfiguration will fail;

the system selecting a baseline weighting factor that associates, as a function of the received data, an additional degree of user-defined failure risk with reconfiguration tasks performed on the first class of virtual servers;

the system identifying historic reconfiguration-failure rates by reviewing previously recorded statistics that enumerate successes and failures of previous server-reconfiguration tasks;

the system inferring a predictive incident probability by performing an artificially intelligent analysis on the statistics,
where the predictive incident probability is inferred from a specific reconfiguration-failure rate, of the identified historic reconfiguration-failure rates, associated with previous attempts to perform the first type of reconfiguration task on a server of the first class;

the system deriving a final failure-risk value by adjusting the baseline failure rate as a function of the predictive incident probability and the baseline weighting factor;

the system determining that the final failure-risk value exceeds a predetermined threshold value; and the system, in response to the determining, directing at least one downstream entity to perform two or more remedial activities that will reduce an impact of a failure of the planned server reconfiguration.

2. The system of claim 1, where the remedial activities are performed prior to initiating the planned server reconfiguration in order to reduce a probability that the planned server reconfiguration will fail.

3. The system of claim 1, where at least one of the remedial activities consists of blocking a mission-critical application from accessing the server during the planned server reconfiguration.

4. The system of claim 1, where at least one of the remedial activities is performed prior to initiating the planned server reconfiguration and consists of notifying a downstream entity about a characteristic of the planned server reconfiguration capable of causing a reconfiguration failure.

5. The system of claim 1, where the artificially intelligent analysis further comprises:

the system defining a set of reconfiguration categories that is each associated with a particular class of server;
the system associating, as a function of the statistics, each reconfiguration category of the set of reconfiguration categories with a server-dependent reconfiguration failure rate; and
the system selecting the specific reconfiguration-failure rate from the server-dependent reconfiguration failure rate.

6. The system of claim 5, where the artificially intelligent analysis further comprises:

the system subdividing each reconfiguration category of the set of reconfiguration categories into a set of reconfiguration subcategories that is each associated with a particular type of reconfiguration task;
the system associating, as a function of the statistics, each subcategory of the set of reconfiguration subcategories with a server-and-task-dependent reconfiguration failure rate; and
the system selecting the specific reconfiguration-failure rate from the server-and-task-dependent reconfiguration failure rate.

7. The system of claim 5, where the artificially intelligent analysis further comprises:

the system determining that the statistics contain no record of a reconfiguration task being performed on a server of the first class;
the system adding a new reconfiguration category to the set of reconfiguration categories, where the new category is associated with a subset of servers that share at least one characteristic with servers of the first class; and
the system associating the new reconfiguration category with the first class of virtual servers.

8. A method for mitigating a likelihood and impact of a server-reconfiguration failure, the method comprising:

a server-management system receiving data submitted by users in response to a set of questions,
where each element of received data provides user-specific information from which can be inferred either a probability that the planned server reconfiguration will fail or a degree of impact on a business function that would result from a failure of the planned server reconfiguration, and
where the planned server reconfiguration comprises performing a first type of reconfiguration task on a server of a first class of virtual server, where a selection of the first class is dependent on an identification of the business function and on a further identification that the server performs the identified business function;

the system computing, as a function of the received data, a baseline failure rate that identifies a user-defined probability that the planned server reconfiguration will fail;

the system selecting a baseline weighting factor that associates, as a function of the received data, an additional degree of user-defined failure risk with reconfiguration tasks performed on the first class of virtual servers;

the system identifying historic reconfiguration-failure rates by reviewing previously recorded statistics that enumerate successes and failures of previous server-reconfiguration tasks;

the system inferring a predictive incident probability by performing an artificially intelligent analysis on the statistics, where the predictive incident probability is inferred from a specific reconfiguration-failure rate, of the identified historic reconfiguration-failure rates, associated with previous attempts to perform the first type of reconfiguration task on a server of the first class;

the system deriving a final failure-risk value by adjusting the baseline failure rate as a function of the predictive incident probability and the baseline weighting factor;

the system determining that the final failure-risk value exceeds a predetermined threshold value; and the system, in response to the determining, directing at least one downstream entity to perform two or more remedial activities that will reduce an impact of a failure of the planned server reconfiguration.

9. The method of claim 8, where the remedial activities are performed prior to initiating the planned server reconfiguration in order to reduce a probability that the planned server reconfiguration will fail.

10. The method of claim 8, where at least one of the remedial activities consists of blocking a mission-critical application from accessing the server during the planned server reconfiguration.

11. The method of claim 8, where at least one of the remedial activities is performed prior to initiating the planned server reconfiguration and consists of notifying a downstream entity about a characteristic of the planned server reconfiguration capable of causing a reconfiguration failure.

12. The method of claim 8, where the artificially intelligent analysis further comprises:

the system defining a set of reconfiguration categories that is each associated with a particular class of server;

the system associating, as a function of the statistics, each reconfiguration category of the set of reconfiguration categories with a server-dependent reconfiguration failure rate; and the system selecting the specific reconfiguration-failure rate from the server-dependent reconfiguration failure rate.

13. The method of claim 12, where the artificially intelligent analysis further comprises:

the system subdividing each reconfiguration category of the set of reconfiguration categories into a set of reconfiguration subcategories that is each associated with a particular type of reconfiguration task;

the system associating, as a function of the statistics, each subcategory of the set of reconfiguration subcategories with a server-and-task-dependent reconfiguration failure rate; and the system selecting the specific reconfiguration-failure rate from the server-and-task-dependent reconfiguration failure rate.

14. The method of claim 8, further comprising providing at least one support service for at least one of creating, integrating, hosting, maintaining, and deploying computer-readable program code in the computer system, where the computer-readable program code in combination with the computer system is configured to implement the receiving, the computing, the selecting, the identifying, the inferring, the deriving, the determining, and the directing.

15. A computer program product, comprising a computer-readable hardware storage device having a computer-readable program code stored therein, the program code configured to be executed by a server-management system, of a network-management platform, comprising a processor, a memory coupled to the processor, and a computer-readable hardware storage device coupled to the processor, the storage device containing program code configured to be run by the processor via the memory to implement a method for mitigating a likelihood and impact of a server-reconfiguration failure, the method comprising:

the system receiving data submitted by users in response to a set of questions, where each element of received data provides user-specific information from which can be inferred either a probability that the planned server reconfiguration will fail or a degree of impact on a business function that would result from a failure of the planned server reconfiguration, and where the planned server reconfiguration comprises performing a first type of reconfiguration task on a server of a first class of virtual server, where a selection of the first class is dependent on an identification of the business function and on a further identification that the server performs the identified business function;

the system computing, as a function of the received data, a baseline failure rate that identifies a user-defined probability that the planned server reconfiguration will fail;

the system selecting a baseline weighting factor that associates, as a function of the received data, an additional degree of user-defined failure risk with reconfiguration tasks performed on the first class of virtual servers;

the system identifying historic reconfiguration-failure rates by reviewing previously recorded statistics that enumerate successes and failures of previous server-reconfiguration tasks;

the system inferring a predictive incident probability by performing an artificially intelligent analysis on the statistics, where the predictive incident probability is inferred from a specific reconfiguration-failure rate, of the identified historic reconfiguration-failure rates, associated with previous attempts to perform the first type of reconfiguration task on a server of the first class;

the system deriving a final failure-risk value by adjusting the baseline failure rate as a function of the predictive incident probability and the baseline weighting factor;

the system determining that the final failure-risk value exceeds a predetermined threshold value; and the system, in response to the determining, directing at least one downstream entity to perform two or more remedial activities that will reduce an impact of a failure of the planned server reconfiguration.

16. The computer program product of claim 15, where the remedial activities are performed prior to initiating the planned server reconfiguration in order to reduce a probability that the planned server reconfiguration will fail.

17. The computer program product of claim 15, where at least one of the remedial activities consists of blocking a mission-critical application from accessing the server during the planned server reconfiguration.

18. The computer program product of claim 15, where at least one of the remedial activities is performed prior to initiating the planned server reconfiguration and consists of notifying a downstream entity about a characteristic of the planned server reconfiguration capable of causing a reconfiguration failure.

19. The computer program product of claim 15, where the artificially intelligent analysis further comprises:

the system defining a set of reconfiguration categories that is each associated with a particular class of server;

the system associating, as a function of the statistics, each reconfiguration category of the set of reconfiguration categories with a server-dependent reconfiguration failure rate; and the system selecting the specific reconfiguration-failure rate from the server-dependent reconfiguration failure rate.

20. The computer program product of claim 19, where the artificially intelligent analysis further comprises:

the system subdividing each reconfiguration category of the set of reconfiguration categories into a set of reconfiguration subcategories that is each associated with a particular type of reconfiguration task;

the system associating, as a function of the statistics, each subcategory of the set of reconfiguration subcategories with a server-and-task-dependent reconfiguration failure rate; and the system selecting the specific reconfiguration-failure rate from the server-and-task-dependent reconfiguration failure rate.

* * * * *